United States Patent
Huangfu et al.

(10) Patent No.: US 11,424,963 B2
(45) Date of Patent: Aug. 23, 2022

(54) CHANNEL PREDICTION METHOD AND RELATED DEVICE

(71) Applicant: Huawei Technologies Co., Ltd., Shenzhen (CN)

(72) Inventors: Yourui Huangfu, Hangzhou (CN); Rong Li, Hangzhou (CN); Jian Wang, Hangzhou (CN); Shengchen Dai, Hangzhou (CN); Jun Wang, Hangzhou (CN); Rongdao Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/196,337

(22) Filed: Mar. 9, 2021

(65) Prior Publication Data
US 2021/0194733 A1    Jun. 24, 2021

Related U.S. Application Data

(63) Continuation of application No. PCT/CN2019/100276, filed on Aug. 12, 2019.

(30) Foreign Application Priority Data

Sep. 10, 2018   (CN) .......................... 201811054284.7

(51) Int. Cl.
H04L 25/02    (2006.01)
(52) U.S. Cl.
CPC ...... *H04L 25/0214* (2013.01); *H04L 25/0204* (2013.01); *H04L 25/0242* (2013.01); *H04L 25/0254* (2013.01)
(58) Field of Classification Search
CPC ............. H04L 25/0214; H04L 25/0204; H04L 25/0242; H04L 25/0254; G06N 3/0445;
(Continued)

(56) References Cited

U.S. PATENT DOCUMENTS

| 5,812,992 A | 9/1998 | De Vries |
| 9,244,888 B2 | 1/2016 | Bernheim Brush et al. |

(Continued)

FOREIGN PATENT DOCUMENTS

| CN | 1543085 A | 11/2004 |
| CN | 1578181 A | 2/2005 |

(Continued)

OTHER PUBLICATIONS

Wei Jiang et al.,"Multi-Antenna Fading Channel Prediction Empowered by Artificial Intelligence",2018 IEEE 88th Vehicular Technology Conference (VTC—Fall), Date of Conference: Aug. 27-30, 2018 ,total:6pages.

(Continued)

*Primary Examiner* — Sung S Ahn
(74) *Attorney, Agent, or Firm* — Conley Rose, P.C.

(57) ABSTRACT

A channel prediction method and a related device, where the method includes: obtaining a first channel coefficient sequence in a first time period, where the first channel coefficient sequence includes a plurality of complex values of a channel coefficient; and determining a prediction value of the channel coefficient in a second time period based on the first channel coefficient sequence and a preset vocabulary of channel changes, where the preset vocabulary of channel changes includes a mapping relationship between a channel change value index and each change value of the channel coefficient, and where the second time period is later than the first time period.

20 Claims, 5 Drawing Sheets

Obtain a first channel coefficient sequence in a first time period, where the first channel coefficient sequence includes a plurality of complex values of a channel coefficient — S401

Determine a prediction value of the channel coefficient in a second time period based on the first channel coefficient sequence and a preset vocabulary of channel changes, where the vocabulary of channel changes includes a mapping relationship between a channel change value index and each change value of the channel coefficient, and the second time period is later than the first time period — S402

(58) Field of Classification Search
CPC .. G06N 3/0454; G06N 3/084; H04B 17/3913; H04B 17/373
See application file for complete search history.

(56) References Cited

U.S. PATENT DOCUMENTS

| | | |
|---|---|---|
| 2005/0025225 A1 | 2/2005 | Niederholz et al. |
| 2005/0118955 A1 | 6/2005 | Idenk et al. |
| 2008/0242233 A1* | 10/2008 | Akita ............... H04B 7/0634 455/101 |
| 2011/0313953 A1 | 12/2011 | Lane et al. |
| 2012/0177204 A1* | 7/2012 | Hellmuth ............... H04S 7/30 381/22 |
| 2014/0100835 A1 | 4/2014 | Majumdar et al. |
| 2016/0091965 A1 | 3/2016 | Wang et al. |
| 2018/0067605 A1 | 3/2018 | Lin et al. |
| 2018/0150742 A1 | 5/2018 | Woulfe et al. |

FOREIGN PATENT DOCUMENTS

| | | |
|---|---|---|
| CN | 104753635 A | 7/2015 |
| CN | 104753835 A | 7/2015 |
| CN | 105142177 A | 12/2015 |
| CN | 107135041 A | 9/2017 |
| CN | 107729927 A | 2/2018 |
| EP | 1463252 A1 | 9/2004 |
| EP | 3352387 A1 | 7/2018 |

OTHER PUBLICATIONS

Tianben Ding et al.,"Fading Channel Prediction Based on Combination of Complex-Valued Neural Networks and Chirp Z-Transform", IEEE Transactions on Neural Networks and Learning Systems (vol. 25, Issue: 9, Sep. 2014),Date of Publication: Mar. 4, 2014 ,total:10pages.

* cited by examiner

| |
|---|
| A vocabulary B of channel changes is degraded to first 11 elements in a vocabulary in a vector representation form |
| New word |
| '+0.02−0.02i' |
| '−0.02+0.02i' |
| '−0.02−0.02i' |
| '+0.02+0.02i' |
| '−0.02+0.01i' |
| '−0.01+0.02i' |
| '+0.01+0.02i' |
| '−0.02−0.01i' |
| '−0.01−0.02i' |
| '+0.01−0.02i' |

FIG. 5

| Top 10 pairs of most frequently occurring mapping relationships in a vocabulary of channel changes | | | Top 10 pairs of least frequently occurring mapping relationships in a vocabulary of channel changes | | |
|---|---|---|---|---|---|
| Channel change value index | Change value of a channel coefficient | Occurrence frequency | Channel change value index | Change value of a channel coefficient | Occurrence frequency |
| 1 | '+0.02−0.02i' | 538211 | N−9 | '+0.2−0.05i' | 12 |
| 2 | '−0.02+0.02i' | 536925 | N−8 | '−0.04+0.2i' | 12 |
| 3 | '−0.02−0.02i' | 535761 | N−7 | '−0.03+0.2i' | 12 |
| 4 | '+0.02+0.02i' | 534726 | N−6 | '−0.1−0.2i' | 12 |
| 5 | '−0.02+0.01i' | 373125 | N−5 | '−0.06−0.2i' | 11 |
| 6 | '−0.01+0.02i' | 371946 | N−4 | '−0.05−0.2i' | 11 |
| 7 | '+0.01+0.02i' | 371856 | N−3 | '+0.01+0.2i' | 11 |
| 8 | '−0.02−0.01i' | 371778 | N−2 | '+0.2+0.01i' | 11 |
| 9 | '−0.01−0.02i' | 371682 | N−1 | '+0.05+0.2i' | 11 |
| 10 | '+0.01−0.02i' | 371673 | N | '+0.2+0.05i' | 11 |

FIG. 6

CHANNEL PREDICTION METHOD AND RELATED DEVICE

CROSS-REFERENCE TO RELATED APPLICATIONS

This application is a continuation of International Patent Application No. PCT/CN2019/100276, filed on Aug. 12, 2019, which claims priority on Chinese Patent Application No. 201811054284.7, filed on Sep. 10, 2018. The disclosures of the aforementioned applications are hereby incorporated by reference in their entireties.

TECHNICAL FIELD

This application relates to the field of wireless network technologies, and in particular, to a channel prediction method and a related device.

BACKGROUND

In a wireless communications system, a transmitter sends a signal, and a receiver receives the signal sent by the transmitter. A wireless link between the transmitter and the receiver is referred to as a wireless channel. Propagation paths between the transmitter and the receiver are complex. For example, buildings, streets, and movement of other objects cause signal reflection, refraction, and diffraction. The signal received by the receiver is a superimposed signal of all signals that arrive at the receiver through different transmission paths. Therefore, the wireless channel is an important factor that affects the wireless communications system. Channel estimation is to estimate a wireless channel response between a transmit antenna and a receive antenna, to be specific, estimate time domain or frequency domain characteristics of the channel based on a receiving sequence whose amplitude and phase are changed due to impact of the multipath channel of the receiver and to which a white noise is superimposed. However, accuracy of a channel coefficient estimated using an existing channel estimation algorithm is low.

SUMMARY

Embodiments of this application provide a channel prediction method and a related device, to improve channel prediction accuracy.

According to a first aspect, an embodiment of this application provides a channel prediction method, including: First, a first channel coefficient sequence in a first time period is obtained, where the first channel coefficient sequence includes a plurality of complex values of a channel coefficient. Then, a prediction value of the channel coefficient in a second time period is determined based on the first channel coefficient sequence and a preset vocabulary of channel changes, where the vocabulary of channel changes includes a mapping relationship between a channel change value index and each change value of the channel coefficient, and where the second time period is later than the first time period. The complex-valued channel coefficient is predicted using the vocabulary of channel changes, such that original information of the channel coefficient is retained, and both an amplitude and a phase of a channel can be predicted. This improves accuracy of the predicted channel coefficient.

In a possible design, first, a first channel coefficient change sequence is determined based on the first channel coefficient sequence, where the first channel coefficient change sequence includes a plurality of change values of the channel coefficient. Then, the vocabulary of channel changes is searched for a channel change value index corresponding to each change value in the first channel coefficient change sequence, and a first channel change value index sequence is generated. The first channel change value index sequence is input into a channel prediction model for prediction, to obtain a channel change value index prediction sequence. Finally, the prediction value of the channel coefficient is determined based on the channel change value index prediction sequence. Each change value in the first channel coefficient change sequence is converted into the channel change value index using the vocabulary of channel changes, and the channel change value index is input into the channel prediction model for prediction, such that the complex-valued channel coefficient is predicted, and the accuracy of the predicted channel coefficient is improved.

In another possible design, a complex value of the channel coefficient at a former moment is subtracted from a complex value of the channel coefficient at a latter moment in the first channel coefficient sequence, to obtain each change value in the first channel coefficient change sequence. Alternatively, a complex value of the channel coefficient at a latter moment is subtracted from a complex value of the channel coefficient at a former moment in the first channel coefficient sequence, to obtain each change value in the first channel coefficient change sequence. A quantity of words in the vocabulary of channel changes can be reduced by calculating the change value, for example, changing numerical precision of the change value. This improves search efficiency.

In another possible design, a complex value of the channel coefficient at a last moment is subtracted from a complex value of the channel coefficient at a moment before the last moment in the first channel coefficient sequence, to obtain each change value in the first channel coefficient change sequence. Alternatively, a complex value of the channel coefficient at a start moment is subtracted from a complex value of the channel coefficient at a moment after the start moment in the first channel coefficient sequence, to obtain each change value in the first channel coefficient change sequence. A quantity of words in the vocabulary of channel changes can be reduced by calculating the change value, for example, changing numerical precision of the change value. This improves search efficiency.

In another possible design, a channel coefficient change value prediction sequence corresponding to the channel change value index prediction sequence is determined based on the vocabulary of channel changes. The prediction value of the channel coefficient is determined based on the channel coefficient change value prediction sequence. The channel change value index prediction sequence is converted into the channel coefficient change value prediction sequence using the vocabulary of channel changes. As such, a complex value of the prediction value of the channel coefficient is obtained.

In another possible design, statistics on occurrence frequency of each of the plurality of change values of the channel coefficient in the first channel coefficient change sequence may be collected. Then, an integer is assigned to each change value of the channel coefficient based on the occurrence frequency, to obtain the channel change value index. Finally, the mapping relationship between the channel change value index and each change value is established, to generate the vocabulary of channel changes.

In another possible design, when occurrence frequency of a target change value in the plurality of change values is greater than a preset threshold, an integer is assigned to the target change value of the channel coefficient. The threshold is set to reduce the quantity of words in the vocabulary of channel changes.

In another possible design, the vocabulary includes a plurality of key-value pairs. A value corresponding to a key may be obtained by searching for the key in the vocabulary. The vocabulary of channel changes may include a vocabulary A of channel changes and a vocabulary B of channel changes. A key in the vocabulary A of channel changes is the change value of the channel coefficient, and a value in the vocabulary A of channel changes is the channel change value index. A key in the vocabulary B of channel changes is the channel change value index, and a value in the vocabulary B of channel changes is the change value of the channel coefficient. The vocabulary A of channel changes is used when the channel coefficient change sequence is converted into the channel change value index sequence. The vocabulary B of channel changes is used when the channel change value index sequence is converted into the channel coefficient change sequence. Channel coefficient conversion before channel prediction is implemented using the vocabulary A of channel changes, and channel coefficient conversion after the channel prediction is implemented using the vocabulary B of channel changes, in order to predict the complex-valued channel coefficient.

In another possible design, first, a second channel coefficient sequence may be obtained, where the second channel coefficient sequence includes a plurality of complex values of the channel coefficient. Second, a second channel coefficient change sequence is determined based on the second channel coefficient sequence, where the second channel coefficient change sequence includes a plurality of change values of the channel coefficient. Then, the vocabulary of channel changes is searched for a channel change value index corresponding to each change value in the second channel coefficient change sequence, and a second channel change value index sequence is generated. Finally, the second channel change value index sequence is input into a neural network for training, to obtain the channel prediction model. A large quantity of channel coefficient sequences are input into the neural network for training, to improve prediction accuracy of the channel prediction model, in order to improve channel prediction accuracy.

In another possible design, an input dimension of the neural network and an output dimension of the neural network are the same as a quantity of mapping relationships in the vocabulary of channel changes.

In another possible design, a probability of each prediction value output by the neural network may be obtained. Then, a difference between complex values of every two change values in the vocabulary of channel changes is determined, and a channel change difference matrix is generated. A weighted mean of probabilities of all prediction values is determined based on the channel change difference matrix and the probability of each prediction value. Finally, whether the neural network has completed training is determined based on the weighted mean. Redundant information related to the complex value in the vocabulary of channel changes is used as an input of a loss function for calculation, and the original loss function is replaced after the training is performed to a certain extent. Alternatively, as the training is performed, a weight that gradually increases is added to the original loss function. In this way, interference in a real environment is reduced.

In another possible design, after the channel prediction model is obtained through training, the channel prediction model may be trained to obtain an updated channel prediction model. For example, parameters of some layers in the channel prediction model may be kept unchanged, and parameters of some other layers are changed, to obtain the updated channel prediction model. The channel prediction model is updated, to improve accuracy of predicting the channel coefficient using the channel prediction model.

In another possible design, a structure of the channel prediction model is a model of the neural network, and parameters (for example, a weight) in the model may be changed through training of the neural network, or may be changed in a value assignment manner. A communications device may send or receive locations and values of these parameters in a wired or wireless manner. The location may include a number of the channel prediction model to which the parameter belongs, a number of a layer in the channel prediction model to which the parameter belongs, and a number of a location in a parameter matrix of the layer in the channel prediction model to which the parameter belongs. The channel prediction model is updated, to improve accuracy of predicting the channel coefficient using the channel prediction model.

In another possible design, after the prediction value of the channel coefficient in the second time period is determined based on the first channel coefficient sequence and the preset vocabulary of channel changes, demodulation or decoding may be performed on data based on the prediction value, or adaptive transmission may be performed based on the prediction value, to improve a system throughput.

In another possible design, when a system throughput generated by performing the demodulation, decoding, or adaptive transmission using the prediction value is higher than a prediction throughput threshold, channel prediction may be performed using the channel prediction model. The channel coefficient may be obtained through channel estimation when a system throughput generated by performing the demodulation, decoding, or adaptive transmission using the prediction value is not higher than a prediction throughput threshold.

In another possible design, demodulation, decoding, or adaptive transmission may be performed on data in a channel estimation window T1 using a channel estimation value obtained through channel estimation, or demodulation, decoding, or adaptive transmission may be performed on data in a channel prediction window T2 using the prediction value of the channel coefficient. Alternatively, a channel estimation value obtained through channel estimation may be obtained, and a channel prediction weighted value is determined based on the channel estimation value obtained through the channel estimation and the prediction value. Demodulation, decoding, or adaptive transmission is performed on data in a channel prediction window T2 based on the channel prediction weighted value. The channel coefficient is predicted with reference to the channel estimation and the channel prediction model, to improve the channel prediction accuracy.

In another possible design, extrapolation processing may be performed on a channel coefficient sequence in a channel prediction window, to obtain a channel extrapolation value in the channel prediction window. Then, a weighted mean of a channel estimation value, the channel extrapolation value, and the prediction value is determined, and demodulation, decoding, or adaptive transmission is performed using the weighted mean. In this way, robustness of the channel prediction value can be improved.

In another possible design, a signal value in a channel prediction window may be obtained, and the channel coefficient is predicted with reference to the signal value and the channel prediction model, to improve the channel prediction accuracy.

According to a second aspect, an embodiment of this application provides a channel prediction apparatus. The channel prediction apparatus is configured to implement the method and the function performed by the communications device in the first aspect, and is implemented by hardware/software. The hardware/software of the channel prediction apparatus includes a unit corresponding to the foregoing function.

According to a third aspect, an embodiment of this application provides a channel prediction device, including a processor, a memory, and a communications bus. The communications bus is configured to implement connection and communication between the processor and the memory, and the processor executes a program stored in the memory, to implement steps in the channel prediction method provided in the first aspect.

In a possible design, the channel prediction device provided in this embodiment of this application may include a corresponding module configured to perform behavior of the channel prediction apparatus in the foregoing method design. The module may be software and/or hardware.

In another possible design, the processor and the memory may alternatively be integrated. The channel prediction device may be a chip.

According to a fourth aspect, an embodiment of this application provides a computer-readable storage medium. The computer-readable storage medium stores an instruction. When the instruction is run on a computer, the computer is enabled to perform the method in the first aspect.

According to a fifth aspect, an embodiment of this application provides a computer program product including an instruction. When the computer program product runs on a computer, the computer is enabled to perform the method in the first aspect.

BRIEF DESCRIPTION OF DRAWINGS

To describe technical solutions in embodiments of this application or in the background clearer, the following briefly describes the accompanying drawings for describing the embodiments of this application or the background.

FIG. 5 is a table of a vocabulary of channel changes according to an embodiment of this application;

FIG. 6 is a table of another vocabulary of channel changes according to an embodiment of this application;

DESCRIPTION OF EMBODIMENTS

The following describes the embodiments of this application with reference to the accompanying drawings in the embodiments of this application.

Figure 1:
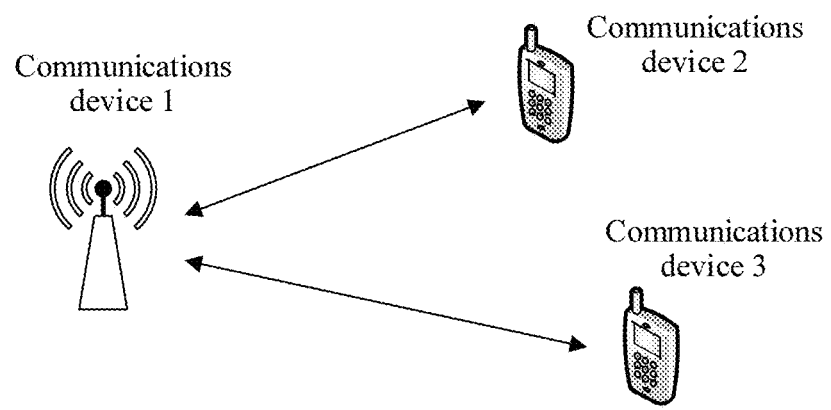
FIG. 1 is a schematic architectural diagram of a wireless communications system according to an embodiment of this application.

FIG. 1 is a schematic architectural diagram of a wireless communications system according to an embodiment of this application. The wireless communications system includes a plurality of communications devices, for example, a communications device 1, a communications device 2, and a communications device 3. The communications device may be a terminal device or a base station. The base station provides a communication service for the terminal device. The base station sends downlink data to the terminal device. The data is encoded through channel coding, and data obtained after channel coding is transmitted to the terminal device after constellation modulation. The terminal device sends uplink data to the base station. The uplink data may also be encoded through channel coding, and encoded data is transmitted to the base station after constellation modulation. The terminal device may be a user equipment, may be a device that provides a voice and/or data connection to a user, may be a device connected to a computing device such as a laptop computer or a desktop computer, or may be an independent device such as a personal digital assistant (PDA). The terminal device may also be referred to as a system, a subscriber unit, a subscriber station, a mobile station, a mobile console, a remote station, an access point, a remote terminal, an access terminal, a user terminal, a user agent, or a user apparatus. The base station may be a device configured to communicate with the terminal device, may be an access point, a relay node, a base transceiver station (BTS), a NodeB (NB), an evolved NodeB (eNB), or a $5^{th}$ generation (5G) base station (e.g., a next generation NodeB (gNB)), and is a device that is in an access network and that communicates with a wireless terminal over an air interface using one or more sectors. By converting a received air interface frame into an Internet Protocol (IP) packet, the base station may serve as a router between the wireless terminal and another part of the access network, and the access network may include an internet protocol network. The base station may further coordinate attribute management for the air interface. In the embodiments of this application, the wireless communications system may be used for channel prediction. A channel coefficient is obtained using a channel prediction method, and the channel coefficient is used for data demodulation, decoding, or adaptive transmission of the base station or the terminal device, to obtain originally transmitted data.

Figure 2:
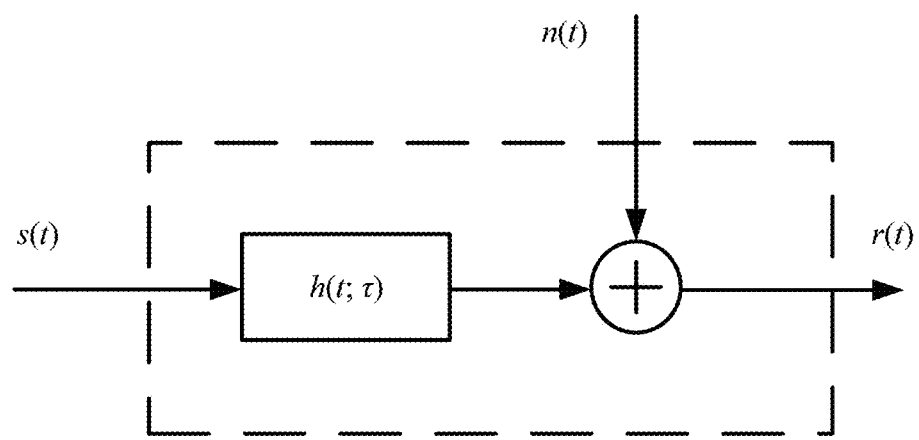
FIG. 2 shows a linear time-varying channel model according to an embodiment of this application.

FIG. 2 shows a linear time-varying channel model according to an embodiment of this application. The linear time-varying channel model satisfies: $r(t)=s(t)*h(t;\tau)+n(t)$, where s(t) is an input signal at a moment t, r(t) is an output signal at the moment t, $h(t;\tau)$ is a channel impulse response, $\tau$ represents a delay, $h(t;\tau)$ represents a distortion and a delay caused by a channel to the input signal at the moment t when the delay is $\tau$, * is a convolution operator, and n(t) is an additive noise on the modulation channel, is also referred to as additive interference, and is irrelevant to the input signal s(t). It can be learned from the linear time-varying channel model that channel estimation may be represented as estimating a wireless channel response between a transmit antenna and a receive antenna, to be more specific, estimating time domain or frequency domain characteristics of the channel based on a receiving sequence whose amplitude and phase are changed due to impact of a multipath channel of a receiver and to which a white noise is superimposed.

Because of randomness of a real channel environment, in a common channel estimation algorithm, calculation is performed only based on a measurement signal at a current moment, and a channel coefficient estimated at a historical moment is not considered. However, as a neural network develops, the neural network is used to learn of a channel feature from seemingly random channel data at the historical moment and to perform inference, to predict a channel coefficient at the current moment or even a future moment.

It should be understood that the randomness of the channel environment is due to a complex multipath effect, a shadow effect, small-scale fading, and the like. A value of a channel coefficient complies with some statistical characteristics. Channel models proposed by a standard organization for link simulation and system simulation are obtained through fitting based on these statistical characteristics. These channel models cannot be used for channel prediction in a real channel environment. However, the neural network is suitable for handling this complex problem that cannot be modeled. An existing neural network-based channel prediction method such as an adaptive linear (adaline) or a non-linear method, includes a multilayer perceptron (MLP), a recurrent neural network (RNN), a convolutional neural network (CNN), a deep neural network (DNN), and the like.

Figure 3:
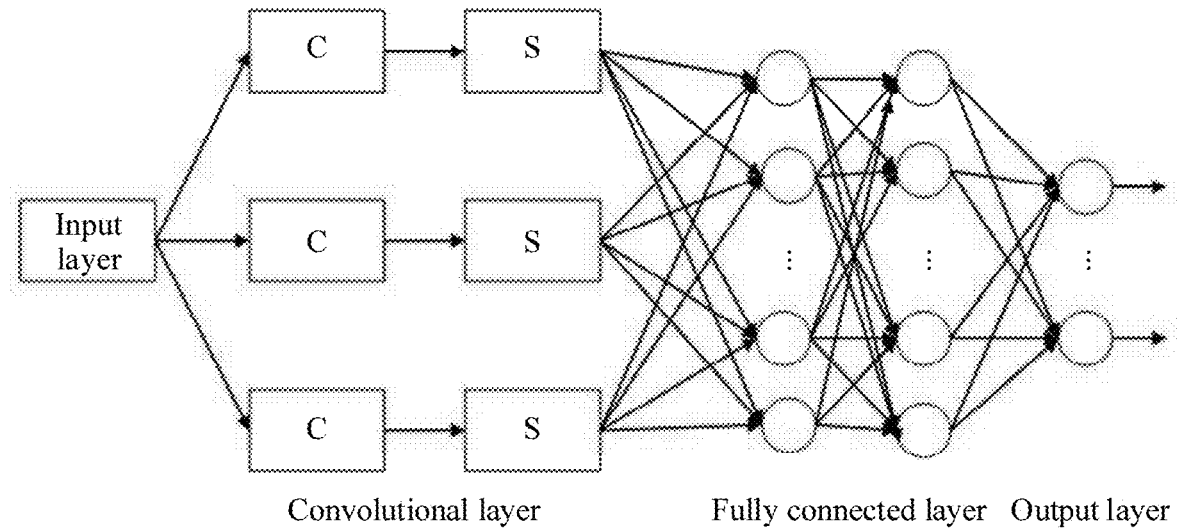
FIG. 3 is a schematic structural diagram of a convolutional neural network according to an embodiment of this application.

FIG. 3 is a schematic structural diagram of a convolutional neural network according to an embodiment of this application. The convolutional neural network includes parts such as an input layer, a convolutional layer, a fully connected layer, and an output layer. The input layer may be used to input data, and the input data is usually an integer. The convolutional layer is mainly used to extract features of the input data. Different convolution kernels extract different features of the input data. A larger quantity of convolution kernels in the convolutional layer indicates a larger quantity of extracted features of the input data. The fully connected layer may include a plurality of fully connected layers. A neuron node in a latter layer is connected to each neuron node in a former layer. Each neuron node in each layer performs forward propagation using a weight on a connection line, and weighted summation is performed to obtain an input into a neuron node in a next layer. A quantity of neuron nodes in the output layer may be set based on a specific application task.

In a process of performing channel prediction based on the foregoing neural network, a channel coefficient is a complex value, and an amplitude and a phase of the channel coefficient represent power and delay changes of a transmission signal. A typical neural network cannot process the complex value, and can learn of only an amplitude (namely, power) of a channel, or separately input an amplitude and a phase of a channel into the neural network for prediction. Consequently, original information of the channel coefficient is destroyed, and accuracy of a predicted channel coefficient is low. To resolve the foregoing technical problem, the embodiments of this application provide the following solutions.

Figure 4:
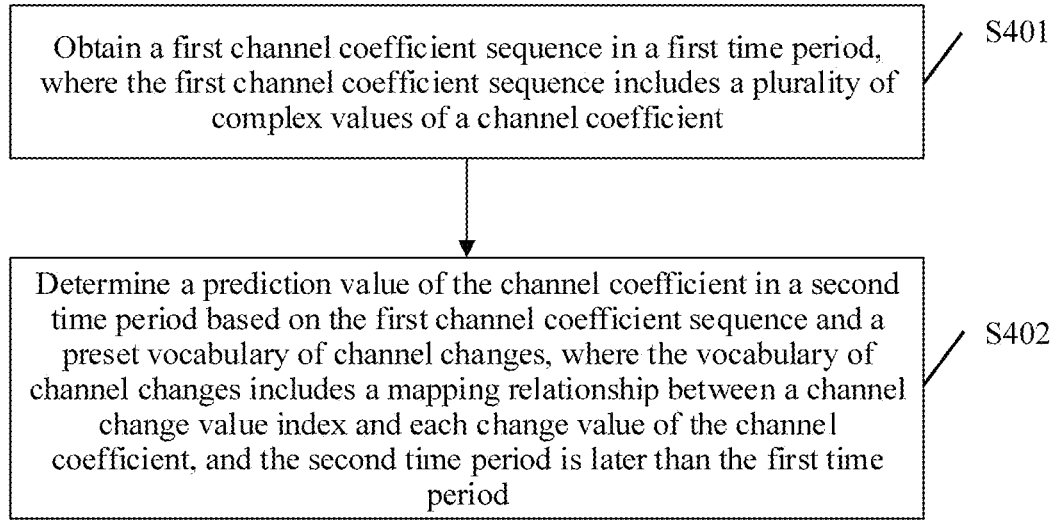
FIG. 4 is a schematic flowchart of a channel prediction method according to an embodiment of this application.

FIG. 4 is a schematic flowchart of a channel prediction method according to an embodiment of this application. As shown in the figure, steps in this embodiment of this application may include at least the following steps.

S401: Obtain a first channel coefficient sequence in a first time period, where the first channel coefficient sequence includes a plurality of complex values of a channel coefficient.

During implementation, a communications device may estimate channel coefficients in a time period through channel estimation, to form the first channel coefficient sequence. The communications device may alternatively receive, in a wired or wireless manner, the first channel coefficient sequence sent by another communications device. The first channel coefficient sequence includes the plurality of complex values of the channel coefficient. The complex value of the channel coefficient may be represented using Cartesian coordinates, for example, in a form of x+yi, or may be represented using polar coordinates in a form of $ae^{ib}$. The channel coefficient may be a time-domain channel coefficient, or may be a frequency-domain channel coefficient. The time-domain channel coefficient and the frequency-domain channel coefficient may be mutually converted. For example, the frequency-domain channel coefficient may be converted into the time-domain channel coefficient through inverse Fourier transform, and the time-domain channel coefficient may be converted into the frequency-domain channel coefficient through Fourier transform. When the channel coefficient is obtained in a real scenario, signal processing operations such as sampling, noise reduction, filtering, amplitude normalization, and fixed-point processing may be performed on the estimated channel coefficient in time domain or frequency domain. To obtain a channel coefficient at a time-frequency resource in which no pilot sequence is placed, a channel estimation value at a time-frequency resource that is near the time-frequency resource and in which a pilot sequence is placed may also be calculated. The calculation includes signal processing operations such as interpolation and extrapolation. The calculation further includes inputting into a neural network. The first time period may be a time point, or may be a time period.

S402: Determine a prediction value of the channel coefficient in a second time period based on the first channel coefficient sequence and a preset vocabulary of channel changes, where the vocabulary of channel changes includes a mapping relationship between a channel change value index and each change value of the channel coefficient, and where the second time period is later than the first time period. The second time period may be a time point, or may be a time period. This step includes the following steps.

First, a first channel coefficient change sequence is determined based on the first channel coefficient sequence, where the first channel coefficient change sequence includes a plurality of change values of the channel coefficient.

In an implementation, a complex value of the channel coefficient at a former moment may be subtracted from a complex value of the channel coefficient at a latter moment in the first channel coefficient sequence, to obtain each change value in the first channel coefficient change sequence. Alternatively, a complex value of the channel coefficient at a latter moment is subtracted from a complex value of the channel coefficient at a former moment in the first channel coefficient sequence, to obtain each change value in the first channel coefficient change sequence. For example, the first channel coefficient sequence is $\{x_1, x_2, x_3, x_4, \ldots, x_i, \ldots, x_n\}$, where $x_i$ (i=1, 2, ..., n) is a complex value. If the complex value of the channel coefficient at the former moment is subtracted from the complex value of the channel coefficient at the latter moment, the first channel coefficient change sequence is $\{x_2-x_1, x_3-x_2, x_4-x_3, x_n-x_{n-1}\}$.

In another implementation, a complex value of the channel coefficient at a last moment may be subtracted from a complex value of the channel coefficient at a moment before the last moment in the first channel coefficient sequence, to obtain each change value in the first channel coefficient change sequence. Alternatively, a complex value of the channel coefficient at a start moment is subtracted from a complex value of the channel coefficient at a moment after the start moment in the first channel coefficient sequence, to obtain each change value in the first channel coefficient change sequence. The first channel coefficient change sequence includes change values of the first channel coefficient sequence, and may be obtained by performing an operation such as addition, subtraction, multiplication, division, a first-order derivative, or a second-order derivative that can represent characteristics of the complex value of the channel coefficient at the former moment and the complex value of the channel coefficient at the latter moment.

Optionally, because different moving speeds of a terminal device cause fast or slow channel changes, in an actual system, different frequency offsets also cause fast or slow phase changes of the channel coefficient. Therefore, a sampling operation or an interpolation operation may be first performed on the first channel coefficient sequence, and then the first channel coefficient change sequence is obtained based on the first channel coefficient sequence on which the sampling operation or the interpolation operation is performed. Alternatively, a phase of the first channel coefficient sequence may be multiplied by a frequency offset, such that phase rotation of a channel becomes faster or slower. For example, a first channel coefficient sequence with a length of 300,000 symbols may be sampled. A value is selected from every 30 symbols to re-form a sampling sequence, and a length of the sampling sequence is 10,000. Then, the first channel coefficient change sequence is determined based on the sampling sequence. For another example, the interpolation operation may be performed on a first channel coefficient sequence with a length of 1,000 symbols. Nine values are inserted between every two symbols, to obtain an interpolation sequence with a length of 10,000. Then, the first channel coefficient change sequence is determined based on the interpolation sequence.

Second, the vocabulary of channel changes is searched for a channel change value index corresponding to each change value in the first channel coefficient change sequence, and a first channel change value index sequence is generated.

The vocabulary of channel changes includes a set including a key and a value, and the key is the change value of the channel coefficient in the first channel coefficient change sequence. For example, the change value of the channel coefficient may be obtained by subtracting the complex value of the channel coefficient at the former moment from the complex value of the channel coefficient at the latter moment in the first channel coefficient sequence, or subtracting the complex value of the channel coefficient at the latter moment from the complex value of the channel coefficient at the former moment in the first channel coefficient sequence. The key is unique in the vocabulary of channel changes, and one key corresponds to one value. The value is usually an integer. In other words, the change value of the channel coefficient corresponds to the channel change value index.

In this embodiment of this application, the vocabulary of channel changes may include a vocabulary A of channel changes and a vocabulary B of channel changes. A key in the vocabulary A of channel changes is the change value of the channel coefficient, and a value in the vocabulary A of channel changes is the channel change value index. A key in the vocabulary B of channel changes is the channel change value index, and a value in the vocabulary B of channel changes is the change value of the channel coefficient. The vocabulary A of channel changes is used when the channel coefficient change sequence is converted into the channel change value index sequence. The vocabulary B of channel changes is used when the channel change value index sequence is converted into the channel coefficient change sequence. The vocabulary B of channel changes is searched for the change value of the channel coefficient using the channel change value index. If channel change value indexes are integers that start from 1 or 0 in ascending order, the vocabulary of channel changes may be degraded to a vector of the change value of the channel coefficient. Therefore, values of the integers do not need to be stored. For example, an index of the first location in the vector is an integer 0, an index of the second location in the vector is an integer 1, an index of the third location in the vector is an integer 2, and so on. The locations correspond to corresponding change values of the channel coefficient. FIG. 5 is a table of the vocabulary B of channel changes according to an embodiment of this application. Channel change value indexes in the vocabulary of channel changes are integers that start from 1 or 0 in ascending order, and are degraded to first 11 elements in a vocabulary that is in a vector representation form.

The vocabulary of channel changes may be temporarily generated based on a current change value of the channel coefficient, or may be pre-stored (generated based on another channel coefficient change sequence). A process of generating the vocabulary of channel changes includes: Statistics on occurrence frequency of each of the plurality of change values of the channel coefficient in the channel coefficient change sequence may be collected. Then, an integer is assigned to each change value of the channel coefficient based on the occurrence frequency, to obtain the channel change value index. Finally, the mapping relationship between the channel change value index and each change value is established, to generate the vocabulary of channel changes.

For example, the statistics on the occurrence frequency of each change value of the channel coefficient in the channel coefficient change sequence may be collected, and the change values are sorted in descending order or ascending order based on the occurrence frequency. Integers starting from 1 in ascending order may be sequentially assigned to the sorted change values, and the assigned integers are used as the channel change value indexes in the vocabulary of channel changes. For example, the vocabulary of channel changes may be represented as {key1:value1, key2:value2, key3:value3, . . . , keyN:valueN}, where the "key" is the key in the vocabulary of channel changes, and the "value" is the value in the vocabulary of channel changes. For example, in the vocabulary of channel changes {"+0.02−0.02i":1, "+0.02+0.02i":2, "−0.02−0.02i":3, "+0.001−0.2i":1234}, the change value +0.02−0.02i of the channel coefficient is used as a key and a corresponding channel change value index is 1, the change value −0.02−0.02i of the channel coefficient is used as a key and a corresponding channel change value index is 3, and the change value +0.001−0.2i of the channel coefficient is used as a key and a corresponding channel change value index is 1234.

Optionally, when occurrence frequency of a target change value in the plurality of change values is greater than a preset threshold, an integer is assigned to the target change value of the channel coefficient. For example, when the statistics on the occurrence frequency of each change value of the channel coefficient in the channel coefficient change sequence are collected, a threshold may be set. When occurrence frequency of a change value is greater than the preset threshold, an integer is assigned to the change value, and the change value is stored in the vocabulary of channel changes. When occurrence frequency of a change value is less than or equal to the preset threshold, no integer is assigned to the change value, and the change value is not stored in the vocabulary of channel changes. For example, the preset threshold is 10. In a channel coefficient change sequence with a length of 100,000, low-frequency change values that occur only ten times or less may not be stored in the vocabulary of channel changes. In this case, a new word may be added to the vocabulary of channel changes and a value is assigned to the word. For example, a new word "unk" is used as a key and 0 is assigned to "unk". When the channel coefficient change sequence is converted into the channel change value index sequence, for a change value that is not stored in the vocabulary of channel changes, because the change value and a corresponding integer cannot be found, the new word "unk" may be used to replace the change value and corresponds to the integer 0.

FIG. 6 is a table of another vocabulary of channel changes according to an embodiment of this application. N is a total quantity of change values in the vocabulary of channel changes, and the table lists only top 10 most and least frequently occurring change values and corresponding channel change value indexes. In addition, the vocabulary of channel changes may retain only change values whose occurrence frequency is greater than 10. For a change value whose occurrence frequency is less than or equal to 10, "unk" may be used to replace the change value and corresponds to the integer 0.

Third, the first channel change value index sequence is input into a channel prediction model for prediction, to obtain a channel change value index prediction sequence. The channel prediction model may be obtained by training the neural network. A method is as follows.

First, a second channel coefficient sequence may be obtained, where the second channel coefficient sequence includes a plurality of complex values of the channel coefficient. The second channel coefficient sequence may be a channel coefficient obtained based on a simulated scenario through channel model simulation, or may be a channel coefficient obtained based on a real scenario through channel estimation and statistics collection performed by a communications device in a real communication environment. Second, a second channel coefficient change sequence is determined based on the second channel coefficient sequence, where the second channel coefficient change sequence includes a plurality of change values of the channel coefficient. This step is the same as the foregoing method for determining the first channel coefficient change sequence based on the first channel coefficient sequence. Details of this step are not described again. Then, the vocabulary of channel changes is searched for a channel change value index corresponding to each change value in the second channel coefficient change sequence, and a second channel change value index sequence is generated. This step is the same as the foregoing method for searching the vocabulary of channel changes for the channel change value index corresponding to each change value in the first channel coefficient change sequence. Details of this step are not described again. Finally, the second channel change value index sequence is input into the neural network for training, to obtain the channel prediction model.

The neural network may be a recurrent neural network (RNN), a convolutional neural network (CNN), a deep neural network (DNN), or any combination thereof. In addition to the channel change value index, an input into the neural network may further include a signal value, namely, a value obtained by performing various calculations on r(t) in FIG. 2. The RNN may be combined with a back propagation through time (BPTT) method or a long short-term memory (LSTM) network and variants thereof, or an RNN-based sequence-to-sequence (Seq2Seq) network and a variant thereof may be used. The Seq2Seq network can complete conversion between two sequences, and is usually used for translation between two languages. In this embodiment of this application, a sequence at a former moment may be used as a language, and a sequence at a latter moment may be used as another language. After the Seq2Seq network implements translation between the two languages, it is equivalent to that the sequence at the former moment is used to generate the sequence at the latter moment. Therefore, channel prediction is implemented. The Seq2Seq network has two RNN networks, and therefore, is more expressive. The two RNN networks may use a same vocabulary of channel changes during training.

It should be noted that in addition to corresponding to an integer, each change value in the channel coefficient change sequence further corresponds to a word vector before the change value is input into the neural network. The word vector represents the change value and is input into a first layer of the neural network for training in the neural network, to continuously update a parameter in the layer, where the layer may also be referred to as an embedding layer. An input dimension of the neural network and an output dimension of the neural network may be the same as a quantity of mapping relationships in the vocabulary of channel changes. For example, each change value may be represented by a word vector with a length of 100. Before being input into the neural network, each word vector may be obtained through initialization, or may be a pre-stored and pre-trained word vector. In addition, to accelerate convergence of the neural network and avoid starting training from zero, in addition to introducing a prestored word vector, a pre-stored and pre-trained channel prediction model may also be used to replace the parameter.

When the neural network is trained, prior information of the change value of the channel coefficient may be used to assist the neural network to converge more quickly. For example, it can be learned from the vocabulary of channel changes that "+0.03+0.001i" corresponds to an integer 105, and "+0.03+0.002i" corresponds to an integer 2370. A relationship between the two cannot be learned of using the integers. However, actually, the two complex values are very close to each other, and a system can even tolerate exchange of the two complex values, but the information has been lost in an integerization process. In a training process, each change value corresponds to a one word vector. If a difference between a plurality of change values is less than a specific value, word vectors corresponding to the plurality of change values are bound. For example, a word vector corresponding to a change value with a minimum loss in the plurality of change values may be assigned to the other change values in the plurality of change values. Alternatively, a change value in the plurality of change values may be selected, the other change values are all trained using a word vector corresponding to the change value, and a loss of the change value may also be used as losses of all the other change values. Alternatively, after an average value of word vectors corresponding to all change values that are close to each other is obtained, the average value is assigned to a word vector corresponding to a change value or the word vectors corresponding to all the change values that are close to each other. In addition, a difference between complex values of every two change values in the vocabulary of channel changes may be determined, and a channel change difference matrix is generated. If there are N mapping relationships in the vocabulary of channel changes, a dimension of the channel change difference matrix is N*N. Elements in an $i^{th}$ row in the channel change difference matrix represent differences between an $i^{th}$ channel change value index and the first to an $N^{th}$ channel change value index in the vocabulary of channel changes.

When the neural network is trained, a loss function may be set, and gradient descent is performed on the neural network by comparing a prediction value output by the neural network with a target value in a training set, to minimize the loss function. Cross-entropy, negative maximum likelihood, mean square error and other statistical methods may be used to calculate the loss. In addition, redundant information related to the complex value in the vocabulary of channel changes is added to the loss function for calculation. The redundant information is used to calculate the loss, and the original loss function is replaced after training is performed to a certain extent. Alternatively, as the training is performed, a weight that gradually increases is added to the original loss function. In this way, interference in a real environment is reduced.

The channel prediction model is determined with reference to the foregoing channel change difference matrix and the loss function. The following steps are included: First, a probability of each prediction value output by the neural network is obtained. The difference between the complex values of every two change values in the vocabulary of channel changes is determined, and the channel change difference matrix is generated. Then, a weighted mean of probabilities of all prediction values is determined based on the channel change difference matrix and the probability of each prediction value. Finally, whether the neural network has completed training is determined based on the weighted mean.

For example, first, the difference between the complex values of every two change values in the vocabulary of channel changes is determined, and the channel change difference matrix is generated. Second, top k small differences in each row in the channel change difference matrix are normalized, and other N−k differences in the row are set to 0. Alternatively, k differences less than a preset value in each row in the channel change difference matrix may be set to 1, and other N−k differences in the row are set to 0. Alternatively, a difference in k differences less than a preset value in each row in the channel change difference matrix may be set to 1, and the other differences in the row may be set to 0, where k is a positive integer greater than 1 and less than N, and N is a positive integer. Then, in the loss function, the channel change difference matrix and the probability of each prediction value output by the neural network are called, a $j^{th}$ row in the channel change difference matrix is read based on a target value j, and weighted summation is performed on data in the $j^{th}$ row in the channel change difference matrix and the probability of the prediction value. Finally, an average value of all loss values obtained through calculation using the loss function is obtained. As the training is performed, when a loss value of the training set is less than that of a validation set, overfitting occurs in the neural network. In this case, a hyperparameter may be adjusted to improve a network generalization ability and perform training again, or a current state of the neural network is stopped in advance. As the loss value decreases, the neural network is trained successfully, that is, the channel prediction model is obtained.

Optionally, after the channel prediction model is obtained through training, the channel prediction model may be trained to obtain an updated channel prediction model. For example, parameters of some layers in the channel prediction model may be kept unchanged, and parameters of some other layers are changed, to obtain the updated channel prediction model. After the channel prediction model is updated, the communications device may send the updated channel prediction model to another communications device in a wired or wireless manner. Optionally, a structure of the channel prediction model is a model of the neural network, and parameters (for example, a weight) in the model may be changed through training of the neural network, or may be changed in a value assignment manner. The communications device may send or receive locations and values of these parameters in a wired or wireless manner. The location may include a number of the channel prediction model to which the parameter belongs, a number of a layer in the channel prediction model to which the parameter belongs, and a number of a location in a parameter matrix of the layer in the channel prediction model to which the parameter belongs. For example, in transfer learning of a channel prediction model W, a base station may keep parameters of some layers in the channel prediction model unchanged, and change only a few parameters in the channel prediction model W, to predict a current channel environment. When a network is idle, the base station may alternatively broadcast, to a specific user, a parameter that needs to be modified, such that a communications device of the specific user updates the channel prediction model based on a modified parameter.

Further, optionally, in a process of updating the channel prediction model, an average bit error rate obtained after each update may be used as a reward or penalty measure, to reinforce learning of an update action of the channel prediction model, in order to obtain an optimal update action. Alternatively, an update action may be revoked. For example, decoding may be performed using the updated channel prediction model, to obtain a bit error rate generated by the decoding, and a reward or penalty action is selected based on the bit error rate, or a scoring system is used based on the bit error rate. A lower bit error rate indicates being closer to a reward, or indicates a higher score. A higher bit error rate indicates being closer to a penalty, or indicates a lower score. Then, the reward, the penalty, or the score is fed back to a training module of the channel prediction model, to drive the training module to perform training in a reinforcement mechanism, to obtain the updated channel prediction model.

Further, optionally, in a process of updating the channel prediction model, a throughput obtained after each update may be used as a reward or penalty measure, to reinforce learning of an update action of the channel prediction model, in order to obtain an optimal update action. Alternatively, an update action may be revoked. For example, adaptive transmission may be performed using the updated channel prediction model, to obtain a throughput generated by a transmission system, and a reward or penalty action is selected based on the throughput, or a scoring system is used based on the throughput. A higher throughput indicates being closer to a reward, or indicates a higher score. A lower throughput indicates being closer to a penalty, or indicates a lower score. Then, the reward, the penalty, or the score is fed back to a training module of the channel prediction model, to drive the training module to perform training in a reinforcement mechanism, to obtain the updated channel prediction model.

Fourth, the prediction value of the channel coefficient is determined based on the channel change value index prediction sequence.

During implementation, a channel coefficient change value prediction sequence corresponding to the channel change value index prediction sequence may be determined based on the vocabulary of channel changes. Then, the prediction value of the channel coefficient is determined based on the channel coefficient change value prediction sequence. For example, if the first channel coefficient change sequence is obtained by subtracting the channel coefficient at the former moment from the channel coefficient at the latter moment, the first channel coefficient change sequence is $\{x_2-x_1, x_3-x_2, x_4-x_3, x_n-x_{n-1}\}$, and a channel coefficient change prediction sequence is $\{y_1, y_2, y_3, y_4, \ldots, y_n\}$. If the last value of the channel coefficient sequence is $y_0=x_n$, the prediction value of the channel coefficient is $\{y_0+y_1, y_0+y_1+y_2, y_0+y_1+y_2+y_3, y_0+y_1+\ldots+y_n\}$. If the first channel coefficient change sequence is obtained by subtracting the channel coefficient at the latter moment from the channel coefficient at the former moment, the channel coefficient change prediction sequence is $\{y_1, y_2, y_3, y_4, \ldots, y_n\}$. If the last value of the channel coefficient sequence is $y_0=x_n$, the prediction value of the channel coefficient is $\{y_0-y_1, y_0-y_1-y_2, y_0-y_1-y_2-y_3, \ldots, y_0-y_1-\ldots-y_n\}$.

Optionally, after the prediction value of the channel coefficient in the second time period is determined based on the first channel coefficient sequence and the preset vocabulary of channel changes, demodulation or decoding may be performed on data based on the prediction value, or adaptive transmission may be performed based on the prediction value, to improve a system throughput. The adaptive transmission includes link adaptation, adaptive modulation, scheduling, power control, precoding selection, and the like.

Optionally, when a system throughput generated by performing the demodulation, decoding, or adaptive transmission using the prediction value is higher than a prediction throughput threshold, channel prediction may be performed using the channel prediction model. Conventional channel estimation may be used when a system throughput generated by performing the demodulation, decoding, or adaptive transmission using the prediction value is not higher than a prediction throughput threshold.

For example, when a communications device A performs decoding using the prediction value, channel estimation is not performed. When a bit error rate in a prediction termination time Tp exceeds a prediction bit error threshold Ft, the communications device A may directly disable the channel prediction model, and restart the channel estimation. Alternatively, the communications device A may request a communications device B to disable the channel prediction model. After receiving an instruction delivered by the communications device B, the communications device A disables the channel prediction model, and restarts the channel estimation. When the bit error rate in the prediction termination determining time Tp does not exceed the prediction bit error threshold Ft, the communications device A may continue to use the channel prediction model for prediction. The prediction termination determining time Tp is less than or equal to prediction duration T2. Optionally, when decoding is performed using the prediction value, the channel prediction model is disabled after the bit error rate in the prediction termination determining time exceeds the prediction bit error threshold N times. Optionally, after the communications device A requests the communications device B to disable the channel prediction model, if no instruction sent by the communications device B is received after a waiting time length T, the communications device A may resend the request, or directly disable the channel prediction model and restart the channel estimation.

Optionally, demodulation, decoding, or adaptive transmission may be performed on data in a channel estimation window T1 using a channel estimation value, or demodulation, decoding, or adaptive transmission may be performed on data in a channel prediction window T2 using the prediction value of the channel coefficient. Alternatively, a channel estimation value obtained through channel estimation may be obtained, and a channel prediction weighted value is determined based on the channel estimation value obtained through the channel estimation and the prediction value. Demodulation, decoding, or adaptive transmission is performed on data in a channel prediction window T2 based on the channel prediction weighted value. Alternatively, channel estimation is performed in a former time period, and then prediction is performed in a latter time period using the channel prediction model. Alternatively, extrapolation processing may be performed on a channel coefficient sequence in a channel prediction window, to obtain a channel extrapolation value in the channel prediction window. Then, a weighted mean of a channel estimation value, the channel extrapolation value, and the prediction value is determined, and demodulation, decoding, or adaptive transmission is performed using the weighted mean. In this way, robustness of the channel prediction value can be improved.

In this embodiment of this application, the channel coefficient sequence including the plurality of complex values of the channel coefficient is obtained, the change values of the channel coefficient are determined, then the vocabulary of channel changes is searched for the channel change value index corresponding to each change value, to generate the channel change value index sequence, and the channel change value index sequence is input into the channel prediction model for prediction, to obtain the channel change value index prediction sequence. The complex-valued channel coefficient is predicted, such that original information of the channel coefficient is retained, and both an amplitude and a phase of a channel are predicted. This improves accuracy of the predicted channel coefficient. Prediction performed using the channel prediction model may also improve efficiency of obtaining the channel coefficient.

Figure 7:
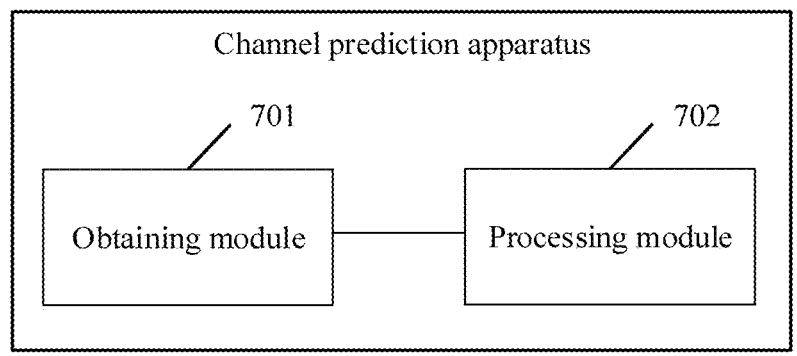
FIG. 7 is a schematic structural diagram of a channel prediction apparatus according to an embodiment of this application.

FIG. 7 is a schematic structural diagram of a channel prediction apparatus according to an embodiment of this application. As shown in the figure, the apparatus in this embodiment of this application includes: an obtaining module 701 configured to obtain a first channel coefficient sequence in a first time period, where the first channel coefficient sequence includes a plurality of complex values of a channel coefficient; and a processing module 702 configured to determine a prediction value of the channel coefficient in a second time period based on the first channel coefficient sequence and a preset vocabulary of channel changes, where the vocabulary of channel changes includes a mapping relationship between a channel change value index and each change value of the channel coefficient, and where the second time period is later than the first time period.

Optionally, the processing module 702 is further configured to: determine a first channel coefficient change sequence based on the first channel coefficient sequence, where the first channel coefficient change sequence includes a plurality of change values of the channel coefficient; search the vocabulary of channel changes for a channel change value index corresponding to each change value in the first channel coefficient change sequence; generate a first channel change value index sequence; input the first channel change value index sequence into a channel prediction model for prediction, to obtain a channel change value index prediction sequence; and determine the prediction value of the channel coefficient based on the channel change value index prediction sequence.

Optionally, the processing module 702 is further configured to: subtract a complex value of the channel coefficient at a former moment from a complex value of the channel coefficient at a latter moment in the first channel coefficient sequence, to obtain each change value in the first channel coefficient change sequence; or subtract a complex value of the channel coefficient at a latter moment from a complex value of the channel coefficient at a former moment in the first channel coefficient sequence, to obtain each change value in the first channel coefficient change sequence.

Optionally, the processing module 702 is further configured to: determine, based on the vocabulary of channel changes, a channel coefficient change value prediction sequence corresponding to the channel change value index prediction sequence; and determine the prediction value of the channel coefficient based on the channel coefficient change value prediction sequence.

Optionally, the obtaining module 701 is further configured to obtain a second channel coefficient sequence, where the second channel coefficient sequence includes a plurality of complex values of the channel coefficient. Additionally, the processing module 702 is further configured to: determine a second channel coefficient change sequence based on the second channel coefficient sequence, where the second channel coefficient change sequence includes a plurality of change values of the channel coefficient; search the vocabulary of channel changes for a channel change value index corresponding to each change value in the second channel coefficient change sequence; generate a second channel change value index sequence; and input the second channel change value index sequence into a neural network for training, to obtain the channel prediction model.

Optionally, the obtaining module 701 is further configured to obtain a probability of each prediction value output by the neural network. Additionally, the processing module 702 is further configured to: determine a difference between complex values of every two change values in the vocabulary of channel changes; generate a channel change difference matrix; determine a weighted mean of probabilities of all prediction values based on the channel change difference matrix and the probability of each prediction value; and determine, based on the weighted mean, whether the neural network has completed training.

An input dimension of the neural network and an output dimension of the neural network are the same as a quantity of mapping relationships in the vocabulary of channel changes.

Optionally, the processing module 702 is further configured to: collect statistics on occurrence frequency of each of the plurality of change values of the channel coefficient; assign an integer to each change value of the channel coefficient based on the occurrence frequency, to obtain the channel change value index; and establish the mapping relationship between the channel change value index and each change value, to generate the vocabulary of channel changes.

Optionally, the processing module 702 is further configured to: when occurrence frequency of a target change value in the plurality of change values is greater than a preset threshold, assign an integer to the target change value of the channel coefficient.

Optionally, the processing module 702 is further configured to perform demodulation, decoding, or adaptive transmission on data based on the prediction value.

Optionally, the processing module 702 is further configured to: when a system throughput generated by performing the demodulation, decoding, or adaptive transmission using the prediction value is higher than a prediction throughput threshold, perform channel prediction using the channel prediction model.

Optionally, the obtaining module 701 is further configured to obtain a channel estimation value obtained through channel estimation. Additionally, the processing module 702 is further configured to: determine a channel prediction weighted value based on the channel estimation value and the prediction value; and perform the demodulation, decoding, or adaptive transmission on the data based on the channel prediction weighted value.

It should be noted that, for implementation of the modules, further refer to corresponding descriptions in the method embodiment shown in FIG. 4, and the modules perform the method and function that are performed by the communications device in the foregoing embodiment.

Figure 8:
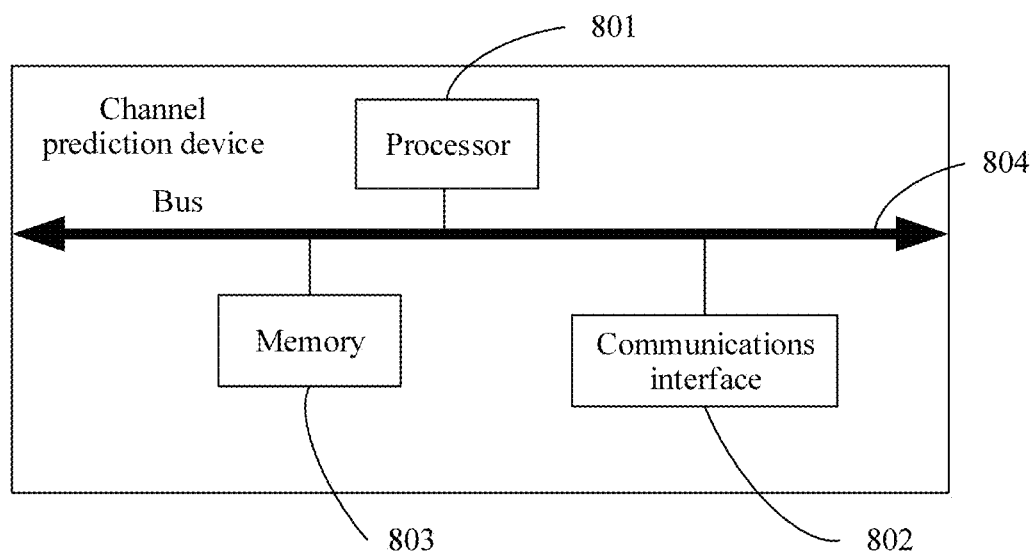
FIG. 8 is a schematic structural diagram of a channel prediction device according to an embodiment of this application.

FIG. 8 is a schematic structural diagram of a channel prediction device according to an embodiment of this application. As shown in FIG. 8, the channel prediction device 801 may include at least one processor 801, at least one communications interface 802, at least one memory 803, and at least one communications bus 804. Certainly, in some implementations, the processor and the memory may alternatively be integrated. The channel prediction device may be a chip.

In this embodiment of this application, the memory 803 may be configured to store a channel prediction model and a vocabulary of channel changes. The processor 801 may include a central processing unit, a baseband processor, and a neural network processor. For example, after receiving a channel prediction instruction of the baseband processor, the central processing unit may read the channel prediction model from the memory 803 and input the channel prediction model into the neural network processor, and the baseband processor writes a channel coefficient sequence into the neural network processor through a central processing unit. The neural network processor processes the channel coefficient sequence based on the vocabulary of channel changes, inputs a channel change value index sequence obtained through processing into the channel prediction model for prediction, and finally obtains a prediction value of the channel coefficient. Finally, the central processing unit writes the prediction value of the channel coefficient into the baseband processor, and the baseband processor performs demodulation, decoding, or adaptive transmission on data based on the prediction value.

The processor 801 may implement or execute various example logical blocks, modules, and circuits described with reference to content disclosed in this application. Alternatively, the processor may be a combination of processors implementing a computing function, for example, a combination of one or more microprocessors or a combination of a digital signal processor and a microprocessor. The communications bus 804 may be a peripheral component interconnect (PCI) bus, an extended industry standard architecture (EISA) bus, or the like. The bus may be classified as an address bus, a data bus, a control bus, or the like. For ease of representation, only one thick line is used to represent the bus in FIG. 8, but this does not mean that there is only one bus or only one type of bus. The communications bus 804 is configured to implement communication connection between these components. The communication interface 802 of the device in this embodiment of this application is configured to perform signaling or data communication with another node device. The memory 803 may include a volatile memory, for example, a nonvolatile dynamic random access memory (NVRAM), a phase-change random access memory (PRAM), or a magnetoresistive random access memory (MRAM). The memory 803 may further include a nonvolatile memory, for example, at least one magnetic disk storage device, an electrically erasable programmable read-only memory (EEPROM), a flash memory device such as a NOR flash memory or a NAND flash memory, or a semiconductor device such as a solid-state drive (SSD). Optionally, the memory 803 may alternatively be at least one storage apparatus that is far away from the processor 801. Optionally, the memory 803 may further store a group of program code, and optionally, the processor 801 may further execute a program stored in the memory 803 to perform the following operations: obtaining a first channel coefficient sequence in a first time period, where the first channel coefficient sequence includes a plurality of complex values of a channel coefficient; and determining a prediction value of the channel coefficient in a second time period based on the first channel coefficient sequence and a preset vocabulary of channel changes, where the vocabulary of channel changes includes a mapping relationship between a channel change value index and each change value of the channel coefficient, and where the second time period is later than the first time period.

Optionally, the processor 801 is further configured to perform the following operations: determining a first channel coefficient change sequence based on the first channel coefficient sequence, where the first channel coefficient change sequence includes a plurality of change values of the channel coefficient; searching the vocabulary of channel changes for a channel change value index corresponding to each change value in the first channel coefficient change sequence; generating a first channel change value index sequence; inputting the first channel change value index sequence into a channel prediction model for prediction, to obtain a channel change value index prediction sequence; and determining the prediction value of the channel coefficient based on the channel change value index prediction sequence.

Optionally, the processor 801 is further configured to: perform the following operations: subtracting a complex value of the channel coefficient at a former moment from a complex value of the channel coefficient at a latter moment in the first channel coefficient sequence, to obtain each change value in the first channel coefficient change sequence; or subtracting a complex value of the channel coefficient at a latter moment from a complex value of the channel coefficient at a former moment in the first channel coefficient sequence, to obtain each change value in the first channel coefficient change sequence.

Optionally, the processor 801 is further configured to perform the following operations: determining, based on the vocabulary of channel changes, a channel coefficient change value prediction sequence corresponding to the channel change value index prediction sequence; and determining the prediction value of the channel coefficient based on the channel coefficient change value prediction sequence.

Optionally, the processor 801 is further configured to perform the following operations: obtaining a second channel coefficient sequence, where the second channel coefficient sequence includes a plurality of complex values of the channel coefficient; determining a second channel coefficient change sequence based on the second channel coefficient sequence, where the second channel coefficient change sequence includes a plurality of change values of the channel coefficient; searching the vocabulary of channel changes for a channel change value index corresponding to each change value in the second channel coefficient change sequence; generating a second channel change value index sequence; and inputting the second channel change value index sequence into a neural network for training, to obtain the channel prediction model.

Optionally, the processor 801 is further configured to perform the following operations: obtaining a probability of each prediction value output by the neural network; determining a difference between complex values of every two change values in the vocabulary of channel changes; generating a channel change difference matrix; determining a weighted mean of probabilities of all prediction values based on the channel change difference matrix and the probability of each prediction value; and determining, based on the weighted mean, whether the neural network has completed training.

An input dimension of the neural network and an output dimension of the neural network are the same as a quantity of mapping relationships in the vocabulary of channel changes.

Optionally, the processor 801 is further configured to perform the following operations: collecting statistics on occurrence frequency of each of the plurality of change values of the channel coefficient; assigning an integer to each change value of the channel coefficient based on the occurrence frequency, to obtain the channel change value index; and establishing the mapping relationship between the channel change value index and each change value, to generate the vocabulary of channel changes.

Optionally, the processor 801 is further configured to perform the following operation: when occurrence frequency of a target change value in the plurality of change values is greater than a preset threshold, assigning an integer to the target change value of the channel coefficient.

Optionally, the processor 801 is further configured to perform the following operation: performing demodulation, decoding, or adaptive transmission on data based on the prediction value.

Optionally, the processor 801 is further configured to perform the following operation: when a system throughput generated by performing the demodulation, decoding, or adaptive transmission using the prediction value is higher than a prediction throughput threshold, performing channel prediction using the channel prediction model.

Optionally, the processor 801 is further configured to perform the following operations: obtaining a channel estimation value obtained through channel estimation; determining a channel prediction weighted value based on the channel estimation value and the prediction value; and performing the demodulation, decoding, or adaptive transmission on the data based on the channel prediction weighted value.

Further, the processor may further cooperate with the memory and the communications interface to perform operations of the channel prediction apparatus in the foregoing embodiments of this application.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The objectives, technical solutions, and beneficial effects of this application are further described in detail in the foregoing implementations. Any modification, equivalent replacement, or improvement made without departing from the principle of this application shall fall within the protection scope of this application.

What is claimed is:

1. A channel prediction method, comprising:
obtaining a first channel coefficient sequence in a first time period, wherein the first channel coefficient sequence comprises a plurality of complex values of a channel coefficient; and
determining a prediction value of the channel coefficient in a second time period based on the first channel coefficient sequence and a preset vocabulary of channel changes,
wherein the preset vocabulary of channel changes comprises a mapping relationship between a channel change value index and each change value of the channel coefficient, and
wherein the second time period is later than the first time period.

2. The channel prediction method according to claim 1, wherein determining the prediction value of the channel coefficient comprises:
determining a first channel coefficient change sequence based on the first channel coefficient sequence, wherein the first channel coefficient change sequence comprises a plurality of change values of the channel coefficient;
searching the preset vocabulary of channel changes for a first channel change value index corresponding to each change value in the first channel coefficient change sequence;
generating a first channel change value index sequence;
inputting the first channel change value index sequence into a channel prediction model to obtain a channel change value index prediction sequence; and
determining the prediction value of the channel coefficient based on the channel change value index prediction sequence.

3. The channel prediction method according to claim 2, wherein determining the first channel coefficient change sequence based on the first channel coefficient sequence comprises:

obtaining each change value in the first channel coefficient change sequence by subtracting a complex value of the channel coefficient at a former moment from a complex value of the channel coefficient at a latter moment in the first channel coefficient sequence; or
obtaining each change value in the first channel coefficient change sequence by subtracting a complex value of the channel coefficient at a latter moment from a complex value of the channel coefficient at a former moment in the first channel coefficient sequence.

4. The channel prediction method according to claim 2, wherein determining the prediction value of the channel coefficient based on the channel change value index prediction sequence comprises:
determining, based on the preset vocabulary of channel changes, a channel coefficient change value prediction sequence corresponding to the channel change value index prediction sequence; and
determining the prediction value of the channel coefficient based on the channel coefficient change value prediction sequence.

5. The channel prediction method according to claim 1, further comprising:
obtaining a second channel coefficient sequence, wherein the second channel coefficient sequence comprises a plurality of complex values of the channel coefficient;
determining a second channel coefficient change sequence based on the second channel coefficient sequence, wherein the second channel coefficient change sequence comprises a plurality of change values of the channel coefficient;
searching the preset vocabulary of channel changes for a first channel change value index corresponding to each change value in the second channel coefficient change sequence;
generating a second channel change value index sequence; and
obtaining a channel prediction model by inputting the second channel change value index sequence into a neural network for training.

6. The channel prediction method according to claim 5, further comprising:
obtaining a probability of each prediction value output by the neural network;
determining a difference between complex values of every two change values in the preset vocabulary of channel changes;
generating a channel change difference matrix;
determining a weighted mean of probabilities of all prediction values based on the channel change difference matrix and the probability of each prediction value; and
determining, based on the weighted mean, whether the neural network has completed training.

7. The channel prediction method according to claim 5, wherein an input dimension of the neural network and an output dimension of the neural network are equal to a quantity of mapping relationships in the preset vocabulary of channel changes.

8. The channel prediction method according to claim 1, further comprising:
collecting statistics on an occurrence frequency of each of a plurality of change values of the channel coefficient;
obtaining the channel change value index by assigning an integer to each change value of the channel coefficient based on the occurrence frequency; and
establishing the mapping relationship to generate the preset vocabulary of channel changes.

9. The channel prediction method according to claim 8, wherein obtaining the channel change value index further comprises assigning, when an occurrence frequency of a target change value in the plurality of change values is greater than a preset threshold, an integer to the target change value of the channel coefficient.

10. A channel prediction apparatus, comprising:
a non-transitory memory configured to store instructions; and
a processor coupled to the non-transitory memory and configured to execute the instructions to:
obtain a first channel coefficient sequence in a first time period, wherein the first channel coefficient sequence comprises a plurality of complex values of a channel coefficient; and
determine a prediction value of the channel coefficient in a second time period based on the first channel coefficient sequence and a preset vocabulary of channel changes,
wherein the preset vocabulary of channel changes comprises a mapping relationship between a channel change value index and each change value of the channel coefficient, and
wherein the second time period is later than the first time period.

11. The channel prediction apparatus according to claim 10, wherein the processor is further configured to execute the instructions to:
determine a first channel coefficient change sequence based on the first channel coefficient sequence, wherein the first channel coefficient change sequence comprises a plurality of change values of the channel coefficient;
search the preset vocabulary of channel changes for a first channel change value index corresponding to each change value in the first channel coefficient change sequence;
generate a first channel change value index sequence;
input the first channel change value index sequence into a channel prediction model for prediction to obtain a channel change value index prediction sequence; and
determine the prediction value of the channel coefficient based on the channel change value index prediction sequence.

12. The channel prediction apparatus according to claim 11, wherein the processor is further configured to execute the instructions to:
obtain each change value in the first channel coefficient change sequence by subtracting a complex value of the channel coefficient at a former moment from a complex value of the channel coefficient at a latter moment in the first channel coefficient sequence; or
obtain each change value in the first channel coefficient change sequence by subtracting a complex value of the channel coefficient at a latter moment from a complex value of the channel coefficient at a former moment in the first channel coefficient sequence.

13. The channel prediction apparatus according to claim 11, wherein the processor is further configured to execute the instructions to:
determine, based on the preset vocabulary of channel changes, a channel coefficient change value prediction sequence corresponding to the channel change value index prediction sequence; and
determine the prediction value of the channel coefficient based on the channel coefficient change value prediction sequence.

14. The channel prediction apparatus according to claim 10, wherein the processor is further configured to execute the instructions to:
obtain a second channel coefficient sequence, wherein the second channel coefficient sequence comprises a plurality of complex values of the channel coefficient;
determine a second channel coefficient change sequence based on the second channel coefficient sequence, wherein the second channel coefficient change sequence comprises a plurality of change values of the channel coefficient;
search the preset vocabulary of channel changes for a first channel change value index corresponding to each change value in the second channel coefficient change sequence;
generate a second channel change value index sequence; and
obtain a channel prediction model by inputting the second channel change value index sequence into a neural network for training.

15. The channel prediction apparatus according to claim 14, wherein the processor is further configured to execute the instructions to:
obtain a probability of each prediction value output by the neural network;
determine a difference between complex values of every two change values in the preset vocabulary of channel changes;
generate a channel change difference matrix;
determine a weighted mean of probabilities of all prediction values based on the channel change difference matrix and the probability of each prediction value; and
determine, based on the weighted mean, whether the neural network has completed training.

16. The channel prediction apparatus according to claim 14, wherein an input dimension of the neural network and an output dimension of the neural network are equal to a quantity of mapping relationships in the preset vocabulary of channel changes.

17. The channel prediction apparatus according to claim 10, wherein the processor is further configured to execute the instructions to:
collect statistics on an occurrence frequency of each of a plurality of change values of the channel coefficient;
obtain the channel change value index by assigning an integer to each change value of the channel coefficient based on the occurrence frequency; and
establish the mapping relationship to generate the preset vocabulary of channel changes.

18. The channel prediction apparatus according to claim 17, wherein the processor is further configured to execute the instructions such that when an occurrence frequency of a target change value in the plurality of change values is greater than a preset threshold, the processor assigns an integer to the target change value of the channel coefficient.

19. The channel prediction apparatus according to claim 10, wherein the channel prediction apparatus is a chip.

20. A non-transitory computer-readable storage medium configured to store an instruction that, when executed by a processor of an apparatus, causes the apparatus to:
obtain a first channel coefficient sequence in a first time period, wherein the first channel coefficient sequence comprises a plurality of complex values of a channel coefficient; and determine a prediction value of the channel coefficient in a second time period based on the first channel coefficient sequence and a preset vocabulary of channel changes, wherein the preset vocabulary of channel changes comprises a mapping relationship between a channel change value index and each change value of the channel coefficient, and wherein the second time period is later than the first time period.

* * * * *